(12) United States Patent
Smektala et al.

(10) Patent No.: US 7,920,289 B2
(45) Date of Patent: Apr. 5, 2011

(54) PRINTING SYSTEM AND METHOD

(75) Inventors: Volker Smektala, Camas, WA (US); Lee Walter Jackson, Vancouver, WA (US); Mike Burton, Vancouver, WA (US); Matthew Allen Shepherd, Vancouver, WA (US); Jefferson P. Ward, Brush Prairie, WA (US); Bruce A. Axten, Camas, WA (US); Mark Lund, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2088 days.

(21) Appl. No.: 10/848,348

(22) Filed: May 17, 2004

(65) Prior Publication Data

US 2005/0253894 A1 Nov. 17, 2005

(51) Int. Cl.
*B41J 23/00* (2006.01)

(52) U.S. Cl. ............ 358/1.16; 358/1.2; 358/1.7; 347/37

(58) Field of Classification Search ............... 347/37, 347/40, 41, 12, 19; 358/518, 298, 1.16
See application file for complete search history.

(56) References Cited

U.S. PATENT DOCUMENTS

| | | | | |
|---|---|---|---|---|
| 4,058,056 A * | 11/1977 | Rubin | ................. | 101/93.19 |
| 4,520,455 A * | 5/1985 | Crean et al. | ................. | 358/1.11 |
| 4,965,593 A * | 10/1990 | Hickman | ................. | 347/12 |
| 5,490,237 A | 2/1996 | Zimmerman et al. | | |
| 5,500,667 A * | 3/1996 | Schwiebert et al. | ......... | 347/102 |
| 5,764,869 A | 6/1998 | Bagley et al. | | |
| 6,124,946 A | 9/2000 | Norton | | |
| 6,179,407 B1 * | 1/2001 | Bockman | ................. | 347/40 |
| 6,293,646 B1 * | 9/2001 | Beachnau Hood et al. | ..... | 347/23 |
| 6,313,922 B1 * | 11/2001 | Jackson | ................. | 358/1.16 |
| 6,471,426 B1 | 10/2002 | Shepherd et al. | | |
| 6,648,446 B1 * | 11/2003 | Rutland et al. | ................. | 347/21 |
| 6,776,468 B2 * | 8/2004 | Miller et al. | ................. | 347/9 |
| 6,899,030 B2 * | 5/2005 | Fowlkes et al. | ................. | 101/466 |
| 2002/0130914 A1 * | 9/2002 | Mantell et al. | ................. | 347/15 |
| 2003/0063153 A1 * | 4/2003 | Bauer | ................. | 347/40 |

* cited by examiner

*Primary Examiner* — King Y Poon
*Assistant Examiner* — Allen H Nguyen (57) ABSTRACT

A system and method for printing on media includes a printhead assembly, a memory, and a controller. The printhead assembly is configured to make physical print sweeps relative to print regions of the media and to print within the print regions during the physical print sweeps. The memory communicates with the printhead assembly and is configured to receive data associated with a logical print sweep. The data associated with the logical print sweep controls printing within a first print region of the media during a corresponding first physical print sweep. The controller communicates with the printhead assembly and memory. The controller initiates the first physical print sweep of the printhead assembly before all of the data associated with the logical print sweep is received by the memory.

15 Claims, 5 Drawing Sheets

PRINTING SYSTEM AND METHOD

BACKGROUND

The present invention relates generally to the field of printing, and more particularly to a system and method of printing while reducing memory requirements. An inkjet printing system may include a printhead and an ink supply which supplies liquid ink to the printhead. The printhead ejects ink drops through a plurality of orifices or nozzles and toward a print media, such as a sheet of paper, so as to print onto the print media. Typically, the nozzles are arranged in one or more arrays such that properly sequenced ejection of ink from the nozzles causes characters or other images to be printed upon the print media as the printhead and the print media are moved relative to each other.

In some printers, such as ink jet printers, data associated with sweeps of a printhead are received into a memory or sweep buffer. For many applications, the amount of data that must be stored for a print sweep can be quite significant. In addition, in order to store all of this data for an entire printer sweep, the memory or sweep buffer is a relatively large RAM thereby contributing significantly to the overall cost of the printer. This is especially true in applications where high quality printing involves large amounts of data in each print sweep. Since memory can still be quite costly, the amount of memory needed for an application can contribute significantly to the overall cost of a printer.

For these and other reasons, a need exists for the present invention.

SUMMARY

Exemplary embodiments of the present invention include a system and method for printing on media. The system and method includes a printhead assembly, a memory, and a controller. The printhead assembly is configured to make physical print sweeps relative to print regions of the media and to print within the print regions during the physical print sweeps. The memory communicates with the printhead assembly and is configured to receive data associated with a logical print sweep. The data associated with the logical print sweep controls printing within a first print region of the media during a corresponding first physical print sweep. The controller communicates with the printhead assembly and memory. The controller initiates the first physical print sweep of the printhead assembly before all of the data associated with the logical print sweep is received by the memory.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
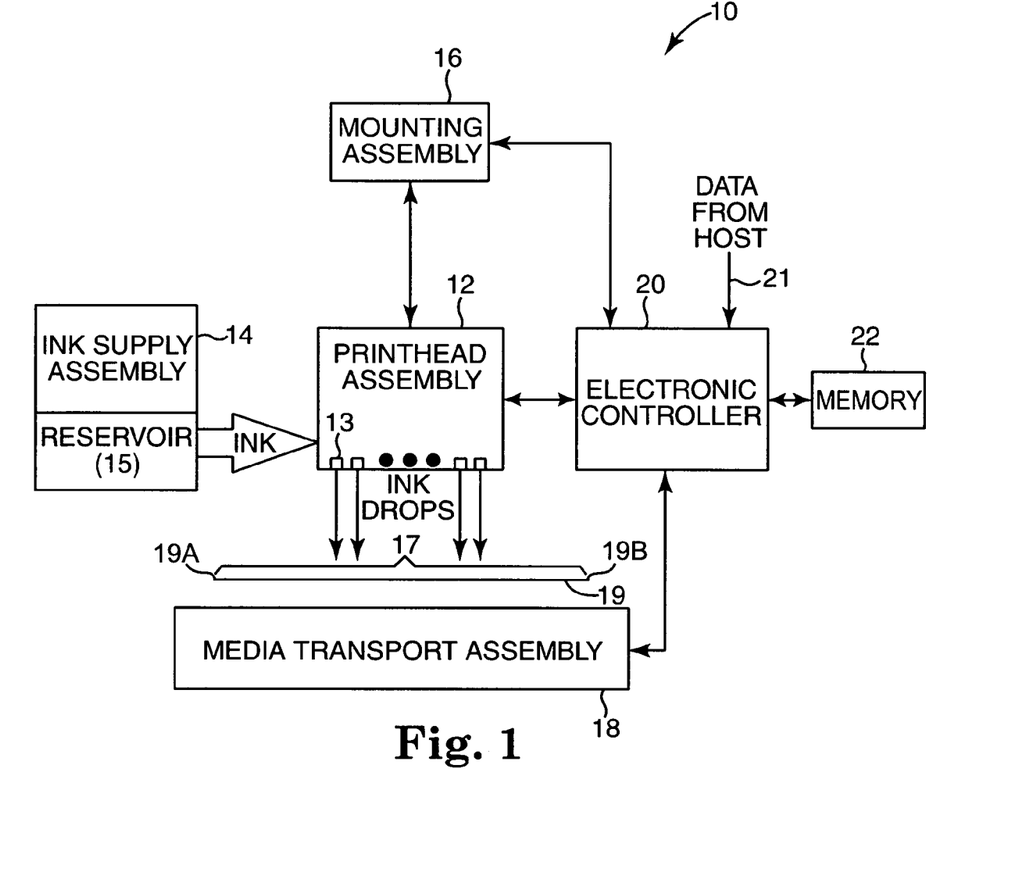
FIG. 1 is a block diagram illustrating one embodiment of a printing system according to the present invention.

FIG. 1 illustrates one embodiment of a portion of a printing system 10. Printing system 10 includes a printhead assembly 12, an ink supply assembly 14, a mounting assembly 16, a media transport assembly 18, and an electronic controller 20. Printhead assembly 12 includes one or more printheads which eject drops of marking fluid or ink, including one or more colored inks, through a plurality of orifices or nozzles 13.

In one embodiment, the drops of ink are directed toward a medium, such as a print media 19, so as to print onto print media 19. Print media 19 includes any type of suitable planar or sheet material, such as paper, card stock, envelopes, labels, transparencies, Mylar, and the like. Typically, nozzles 13 are arranged in one or more columns or arrays such that properly sequenced ejection of ink from nozzles 13 causes characters, symbols, and/or other graphics or images to be printed upon print media 19 as printhead assembly 12 and print media 19 are moved relative to each other.

Ink supply assembly 14 supplies ink to printhead assembly 12 and includes a reservoir 15 for storing ink. As such, in one embodiment, ink flows from reservoir 15 to printhead assembly 12. In one embodiment, printhead assembly 12 and ink supply assembly 14 are housed together in an inkjet print cartridge or pen. In another embodiment, ink supply assembly 14 is separate from printhead assembly 12 and supplies ink to printhead assembly 12 through an interface connection, such as a supply tube.

Mounting assembly 16 positions printhead assembly 12 relative to media transport assembly 18, and media transport assembly 18 positions print media 19 relative to printhead assembly 12. As such, printhead assembly 12 deposits ink drops on print media 19 adjacent to nozzles 13.

In one embodiment, mounting assembly 16 includes a carriage and a carriage drive assembly. As such, printhead assembly 12 is removably mounted in, and supported by, the carriage, and the carriage drive assembly moves the carriage and, therefore, printhead assembly 12 relative to print media 19. A conventional carriage drive assembly may include a carriage guide which supports the carriage, a drive motor, and a belt and pulley system which moves the carriage along the carriage guide.

In one embodiment, printhead assembly 12 ejects drops of ink onto print media 19 while printhead assembly 12 traverses print media 19 and is moved by mounting assembly 16 from a first edge or side 19A of print media 19 to a second edge or side 19B of print media 19, and also while it moves back from second side 19B to first side 19A. Moving or sweeping printhead assembly 12 from side-to-side of print media 19, such as from first side 19A to second side 19B, is referred to herein as a physical print sweep. As printhead assembly 12 is moved from side-to-side of print media 19, such as from first side 19A to second side 19B, during the physical print sweep, a print region 17 of the media is covered or traversed. In this way, ink drops may be deposited within the print region 17.

In one embodiment, electronic controller 20 communicates with printhead assembly 12, mounting assembly 16, and media transport assembly 18. Electronic controller 20 receives data 21 from a host system, such as a computer, and accesses memory 22 for temporarily storing data 21. Data 21 is sent to printing system 10 along an electronic, infrared, optical or other information transfer path. Data 21 represents, for example, an image or graphics to be printed. As such, data 21 forms a print job for printing system 10 and includes one or more print job commands and/or command parameters.

In one embodiment, electronic controller 20 provides control of printhead assembly 12 including timing control for ejection of ink drops from nozzles 13. As such, electronic controller 20 defines a pattern of ejected ink drops which form characters, symbols, and/or other graphics or images on print media 19. Timing control and, therefore, the pattern of ejected ink drops, is determined by the print job commands and/or command parameters and data 21. In one embodiment, logic and drive circuitry forming a portion of electronic controller 20 is located on printhead assembly 12. In another embodiment, logic and drive circuitry forming a portion of electronic controller 20 is located off printhead assembly 12.

Data 21, including the information to be printed and related printer commands, is stored in memory 22. In some embodiments, the data that represents the image or graphics to be printed is stored on a per sweep basis, referred to herein as a logical print sweep. In this way, data for a single logical print sweep can be delivered to printhead assembly 12 while printhead assembly 12 is in a physical print sweep such that the data of the logical print sweep controls the depositing of ink within print region 17 of media 19 during the corresponding physical print sweep. Data for one logical print sweep can correspond to one physical print sweep of the printhead assembly 12 such that data for one logical print sweep can be printed within the print region 17 during a physical print sweep.

Data for printing within print region 17 of media 19 may be delivered in a single physical print sweep or in multiple physical print sweeps. In printing systems that are configured with a single pass print mode, data to be printed in a particular print region 17 of media 19 may be delivered in a single physical print sweep. In a multi-pass print mode, data to be printed in a particular print region 17 of media 19 may be delivered in more than one physical print sweep. Multi-pass print modes are typical used for higher quality printing requirements.

In some embodiments of printing system 10 of the present invention, the physical print sweep of printhead assembly 12 can begin before memory 22 receives all of the data for the corresponding logical print sweep for a print region. Consequently, printing system 10 does not need to wait for all of the data of the logical print sweep to enter memory 22 in order to initiate the corresponding physical print sweep. In one embodiment, while printhead assembly 12 is engaged in a physical print sweep, printing system 10 anticipates that the remainder of the data of the corresponding logical print sweep will arrive in memory 22 before it is needed by printhead assembly 12 as printhead assembly 12 prints within the print region 17. In effect, printing system 10 has "good faith" that the remainder of the data in the logical print sweep will arrive on time to be used by the sweeping printhead assembly 12.

By using good faith printing, a size of memory 22 of printing system 10 can be reduced since memory 22 can be sized to store data for less than an entire single print sweep. For example, memory 22 can be configured as a smaller memory and rely on initiating a physical print sweep before all the data for a corresponding logical print sweep is received in memory 22. Consequently, even where high quality printing with large amounts of data is needed for each print sweep, printing system 10 can utilize a smaller memory 22, by relying on initiating a print sweep before all of that data needed for the sweep arrives in memory 22.

In one embodiment, when printing system 10 is engaged in good faith printing and the remaining data for a logical print sweep does not arrive in memory 22 in time for printhead assembly 12 to utilize the data during the corresponding physical print sweep, printhead assembly 12 will stop delivering ink to media 19, or "punt", in mid-sweep. The point at which printhead assembly 12 stops delivering ink is referred to herein as the punting boundary in the print region 17. Printing system 10 will then wait for remaining data in the logical print sweep to be received in memory 22, and then re-start printing by printhead assembly 12 at the punting boundary in order to finish printing data from the logical print sweep to the print region 17. As such, a logical print sweep that includes a punt, will be split and data from that logical print sweep will be delivered to print region 17 via printhead assembly 12 in separate physical print sweeps. In some embodiments, several physical print sweeps of printhead assembly 12 may be used to deliver data from a logical print sweep to print region 17.

In order to use good faith printing, printing system 10 monitors the amount of data available in memory 22 for printing. A variety of mechanisms may be employed to determine when it is appropriate to begin a physical print sweep, as will be discussed below. For example, a launch percentage may be assigned such that printhead assembly 12 will be launched for a physical print sweep once a certain percentage of data for the corresponding logical print sweep is received in memory 22. In one exemplary embodiment, the launch percentage assigned is 30 percent. In this way, when 30 percent of the data of a logical print sweep is received in memory 22, printhead assembly 12 will begin a corresponding physical print sweep printing data to the corresponding print region 17. In some embodiments, the remaining data from the logical print sweep will arrive into memory 22 and, therefore, be available to printhead assembly 12 while printhead assembly 12 is still continuing the physical print sweep. Because the rate at which data 21 is received from the host is to some degree predictable, the launch percentage can be selected so that the data arrives to finish printing in the print region 17 without a punt.

In some cases, however, the data from the logical print sweep is exhausted during a physical print sweep and the punt occurs. If, during a physical print sweep, printhead assembly 12 was not able to complete printing within the print region 17 because the available data in the logical print sweep was exhausted, printhead assembly 12 will punt, reposition, wait for the assigned launch percentage of the data from the logical print sweep to enter memory 22, and then start printing again at the punting boundary. This process of punting and restarting can be repeated until all data for the logical print sweep has been printed.

By employing good faith printing of the present invention, the size of memory 22 can be reduced. This in turn can reduce the cost of printing system 10. In addition to reduction of product cost, good faith printing can also provide increased flexibility to develop print modes that have higher resolution print sweeps with lower scan speeds than would be practical with previous approaches. With previous approaches, higher resolution print sweeps can be impractical because of the large amount of memory they need for buffering all the data for a single sweep where the amount of data for the sweep is particularly large. These higher resolution, but slower, print modes can sometimes provide better print quality than lower resolution but faster print sweeps. In addition, good faith printing may provide additional advantages in product development, where memory normally needed to buffer large amounts of data for an entire print sweep can be used for other activities.

In some embodiments, the size of memory 22 and speed of data 21 received from the host can be configured such that all of the data for a single sweep can arrive before it is needed by the sweeping printhead assembly 12. There may be situations, however, when all of the data will not have arrived in time. Consequently, when using good faith printing, there may be times when printhead assembly 12 may need to be stopped in mid-sweep (i.e., "punt") and then restarted once all of the data for that print sweep has arrived.

In those situations where printhead assembly 12 may need to punt, retrace, wait for the rest of the data in a logical print sweep to arrive, and then finish the physical print sweep, a print imperfection may occur at the punting boundary. In other words, an imperfection may occur in print region 17 at the boundary between the data from the logical print sweep that was printed in a first physical print sweep (i.e., a first portion of print region 17) and the data from the logical print sweep that was printed in a second physical print sweep (i.e., a second portion of print region 17).

The print imperfection at the punting boundary between the data printed during the first physical print sweep and the data printed during the second physical print sweep may be noticeable when a punt is repeated in two or more consecutive logical print sweeps at the same horizontal position and vertically offset from each other. Consequently, in some embodiments of the present invention certain measures are employed to ensure that the print imperfection, which may occur when using good faith printing, is hidden.

One such measure is to employ inter-sweep dithering to hide the print imperfection by randomly dithering the punting boundary that occurs during a good faith print. More particularly, inter-sweep dithering tracks the amount of data received in memory 22 for a logical print sweep and assigns a variable X to represent the amount of data. A random number Z, for example between 1 and Y, is then generated for each logical print sweep. Then when printhead assembly 12 is launched in a physical print sweep, printing system 10 monitors printhead assembly 12 such that when printhead assembly 12 reaches a position that is defined by X-Z, and X does not correspond with the end of the physical print sweep, a punt occurs. In other words, when printing system 10 detects that printhead assembly 12 has reached a point corresponding to a value representing the amount of data stored in memory 22 for the corresponding logical print sweep minus the random generated number for that logical print sweep, and printhead assembly 12 has not reached the end of the print sweep, printhead assembly 12 will stop printing at that point.

Thus, inter-sweep dithering essentially causes the punt to occur at some randomly generated time before memory 22 runs out of data for the current logical print sweep. Printing system 10 will then wait for the rest of the data in that logical print sweep to arrive in memory 22. After the arrival of the remaining data, or arrival of some percentage of the remaining data, a second physical print sweep of printhead assembly 12 will occur so that remaining data from the logical print sweep can be printed by printhead assembly 12 starting at the punting boundary.

Since a new random number Z is assigned for each logical print sweep, in those situations where a punt occurs, the punting boundary will be at a variable location within print region 17. Thus, when the next logical print sweep arrives in memory 22 and a corresponding physical print sweep occurs for that data, if a punt occurs, it is unlikely that the punt would be at the same location as the previous punt. For multi-pass print modes where there are multiple logical print sweeps for a particular print region 17, randomly varying the location of the punting boundary will effectively obscure the possible imperfection described above.

Figure 2A:
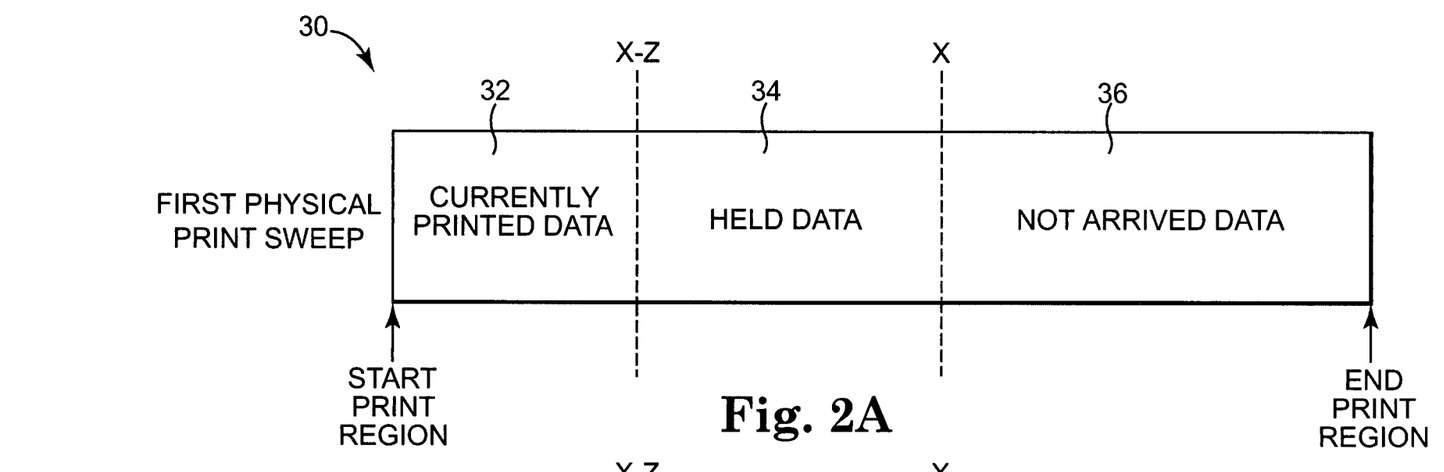
FIGS. 2A and 2B are graphical illustrations of dithering according to one embodiment of the present invention.
Figure 2B:
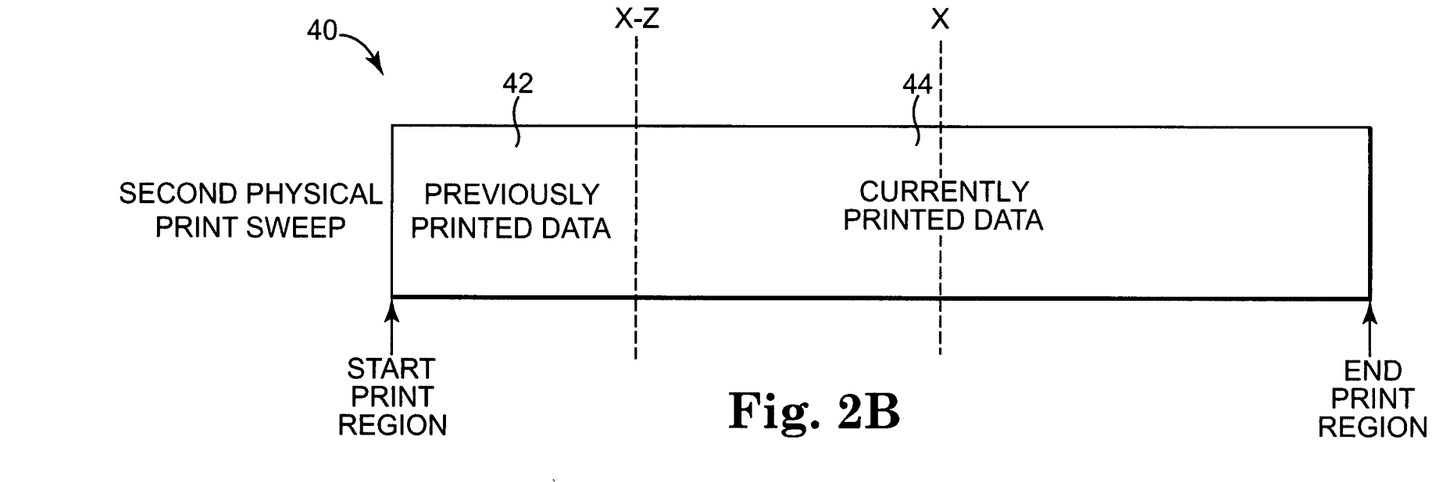

FIGS. 2A and 2B graphically illustrate an embodiment employing inter-sweep dithering to hide possible print quality imperfections caused by good faith printing. An embodiment having a single logical print sweep corresponding to a selected print region 17 is illustrated by the figures. The start and end of print region 17 are illustrated, and may correspond with first and second sides 19A and 19B of media 19.

The variable X represents the amount of data that is in memory 22 for the logical print sweep and the variable Z is a random variable assigned by printing system 10 for that logical print sweep. Print region 17 during first physical print sweep 30 is illustrated in FIG. 2A and print region 17 during second physical print sweep 40 is illustrated in FIG. 2B. First and second physical print sweeps 30 and 40 illustrate the data from a corresponding logical print sweep that, in the case of a punt, is printed to print region 17 of media 19 in separate physical print sweeps.

In FIG. 2A, currently printed data 32, extending from the beginning of the print region during first physical print sweep 30 to dotted line X-Z, illustrates that some of the data for the logical print sweep is in memory 22 and is printed onto media 19 during first physical print sweep 30. Held data 34, extending from dotted line X-Z to dotted line X, illustrates that although an additional amount of data for the logical print sweep is in memory 22, it is not printed onto media 19 during first physical print sweep 30 and is held for second physical sweep 40. Not arrived data 36, extending from dotted line X to the end of print region, illustrates that some of the data for the logical print sweep is not yet in memory 22 when printhead assembly 12 reached the X-Z position during first physical sweep 30.

In FIG. 2B, previously printed data 42, extending from the beginning of the print region during second physical print sweep 40 to dotted line X-Z, illustrates that some of the data for the logical print sweep was already printed during first physical print sweep 30. Currently printed data 44, extending from dotted line X-Z to the end of print region during second physical print sweep 40, illustrates that the remaining data for the logical print sweep is printed onto media 19 during second physical print sweep 40.

Dotted line X-Z illustrates the punting boundary. If inter-swing dithering was not used, the punt would have occurred at dotted line X, where data would have ran out during first physical print sweep 30. Although all of the remaining data is illustrated as printing during second physical print sweep 40 in the illustrated embodiment, it is also possible that additional punting may occur in the second physical print sweep 40 thereby resulting in a third (and maybe additional) physical print sweep to finish printing data from the corresponding logical print sweep.

In one embodiment, for multi-pass print modes, subsequent physical print sweeps corresponding to subsequent logical print sweeps can avoid having punts that occur in the exact same location as X-Z. For example, since a new random variable is generated for each logical print sweep, even where punts occur in consecutive logical print sweeps, the punting boundary will be randomly dithered from one physical sweep to the next physical sweep. As a result, the punting boundary of one logical print sweep may be obscured by the printing of subsequent logical print sweeps.

As may be noted, inter-swing dithering as described above may increase the likelihood that printing system 10 will punt, because it reduces the amount of data that is available to printhead assembly 12 during its physical print sweep by an amount equal to the random number Z. In other words, rather than running out of data for a logical print sweep when the amount of data (X) available in memory 22 is exhausted, printing stops at some random amount Z before that point. In this way, it may be desirable to switch dithering on and off as needed.

One such way that dithering could be switched on and off is for printing system 10 to assign a switch counter variable S and then initially set S to zero. When S is equal to zero, dithering is off, and when S is any non-zero number dithering is on. In one embodiment, if printhead assembly 12 punts during a physical print sweep while printing on media 19, then the variable S is set to a number greater than or equal to the number of passes or sweeps in the print mode being used. For example, if printing system 10 is in a four-pass print mode and a punt occurs, S is set to 4. Then, each time a physical print sweep occurs without a punt, the S variable is decremented by one until it reaches zero and dithering is turned off again.

In this embodiment of printing system 10, dithering is on only when needed, and when it is off, it will not cause printing system 10 to run out of data early. When the variable S is set to a number greater than the number of passes or sweeps in the print mode, this provides for dithering to remain on for at least the remaining passes being used for printing within print region 17 of media 19 such that the punting boundary will be obscured in subsequent print sweeps.

Another measure that may be employed to hide the possible print quality imperfections described above is to randomly dither or vary the launch percentage used by printing system 10. This will have the effect of randomly varying the punting boundary. More particularly, in one embodiment, the launch percentage, or the percentage of a logical print sweep that must be in memory 22 before printhead assembly 12 will begin its corresponding physical print sweep, is randomly varied rather than being set at a fixed percentage. In this way, each time a punt occurs because the data for a logical print sweep does not arrive in the memory 22 in time to be printed, the punting boundary will occur at a different location in the print region 17 since the amount of data that was in the memory 22 at the start of the physical print sweep is different for each punt.

Figure 3A:
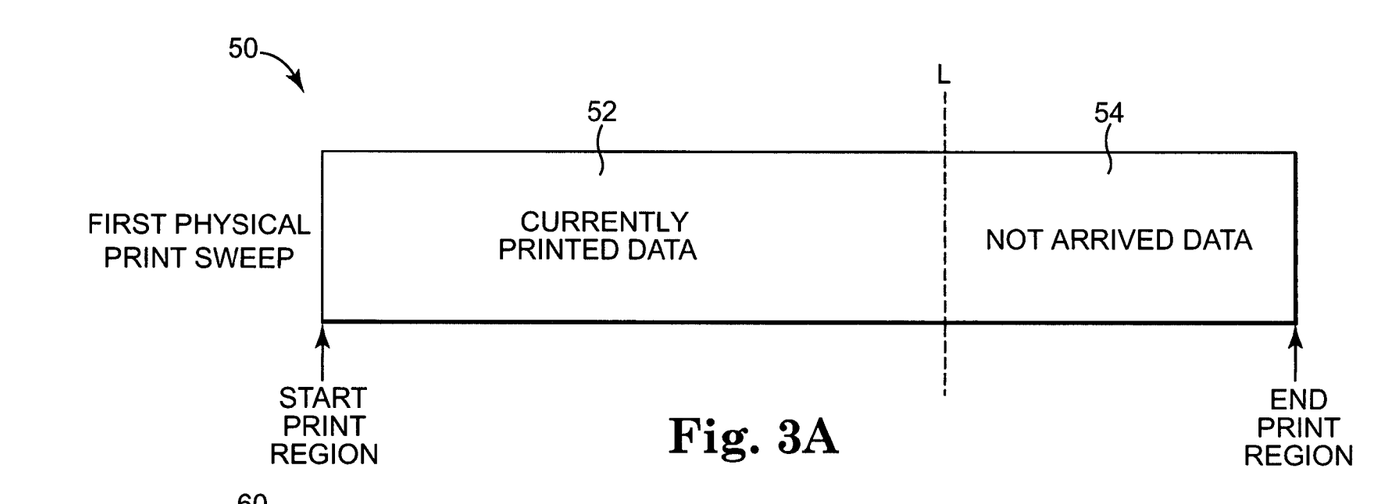
FIGS. 3A and 3B are graphical illustrations of variable launch percentage dithering according to one embodiment of the present invention.
Figure 3B:
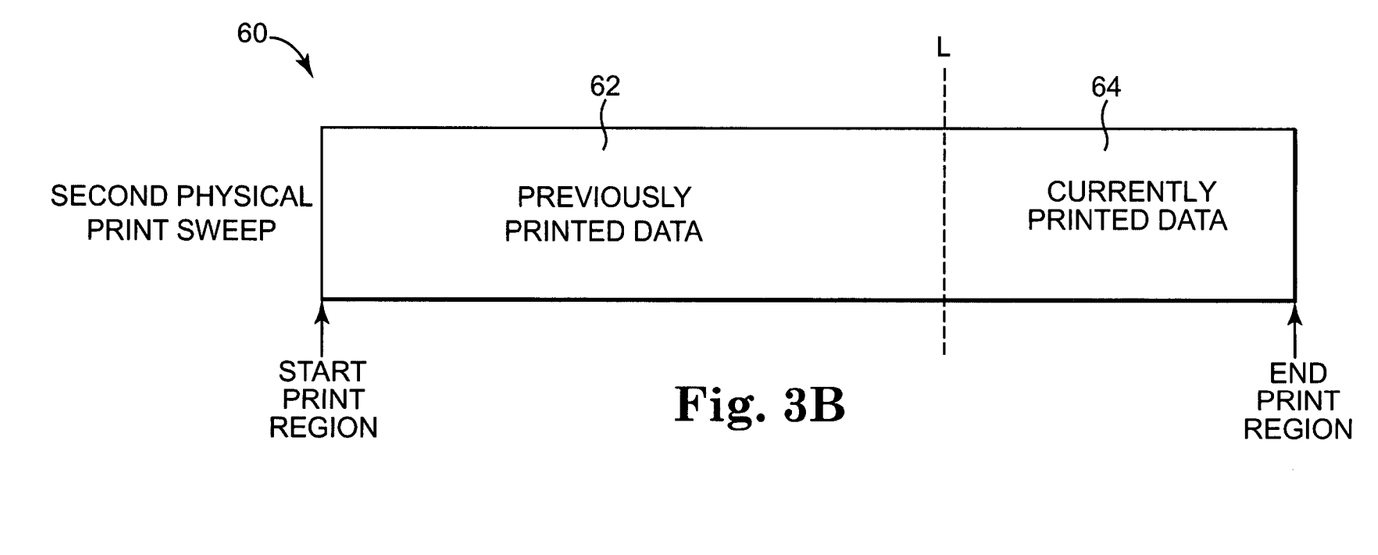

FIGS. 3A and 3B graphically illustrate an embodiment varying the launch percentage to hide possible print quality imperfections caused by good faith printing. An embodiment having a single logical print sweep corresponding to a selected print region 17 is illustrated by the figures. The start and end of print region 17 are illustrated, and in one embodiment may correspond to first and second sides 19A and 19B of media 19.

The variable L represents the amount of data that is in memory 22 for the logical print sweep as may be affected by a randomly selected launch percentage. Thus, in those situations where a punt occurs, the amount of data L will vary from logical print sweep to logical print sweep as the launch percentage varies by a random amount. First physical print sweep 50 is illustrated in FIG. 3A and print region 17 during second physical print sweep 60 is illustrated in FIG. 3B. First and second physical print sweeps 50 and 60 illustrate the data from a corresponding logical print sweep that, in the case of a punt, is printed to print region 17 of media 19 in separate physical print sweeps.

In FIG. 3A, currently printed data 52, extending from the beginning of the print region during first physical print sweep 50 to dotted line L, illustrates that some of the data for the logical print sweep is in memory 22 and is printed within print region 17 of media 19 during first physical print sweep 50. Not arrived data 54, extending from dotted line L to the end of the print region, illustrates that some of the data for the logical print sweep is not yet in memory 22 when printhead assembly 12 reached the position illustrated by dotted line L during first physical print sweep 50. The relative horizontal location of dotted line L changes in each physical print sweep based on the launch percentage used in that sweep. More specifically, in one embodiment, a lower launch percentage would move dotted line L to the left and a higher launch percentage would move dotted line L to the right, relative to the embodiment illustrated in FIGS. 3A and 3B.

In FIG. 3B, previously printed data 62, extending from the beginning of the print region during second physical print sweep 60 to dotted line L, illustrates that some of the data for the logical print sweep was already printed during first physical print sweep 50. Currently printed data 64, extending from dotted line L to the end of the print region, illustrates that the remaining data for the logical print sweep is printed onto media 19 during second physical print sweep 60. Thus, dotted line L illustrates the punting boundary. As described above, the punting boundary may move within the print region with random changes in launch percentage.

In some embodiments of printing system 10, the rate at which data 21 arrives in memory 22 can be predictable such that punting can be minimized. In those situations where a punt occurs, however, such as when sufficient memory is not available, the punt may occur at the same time again and again such that the punting boundary tends to be at a same location of the print region 17 of media 19. By varying the launch percentage, however, the punting boundary is randomly moved to various different locations within print region 17 of media 19.

For example, where a logical print sweep includes 100 kilobytes of data, and sufficient memory is not available such that only 50 kilobytes of additional data can be collected into memory 22 during the corresponding first physical print sweep after the launch, and where the launch percentage is 5 percent of the logical print sweep, the punt will occur after 55 kilobytes of data is printed. If the same conditions apply for the second logical print sweep (after a punt), except that the launch percentage is varied to 25 percent, then the punt will occur after 75 kilobytes of data is printed. Thus, the punting boundary is randomly moved to a different location within print region 17 of media 19 such that the perception of punting boundaries may be minimized or eliminated during printing.

As with inter-sweep dithering, launch percentage dithering may employ switching such that the dithering is turned on and off as needed. Similar to the explanation above, in one embodiment, a sweep counter may be used to turn on launch percentage dithering as needed, and also to leave it on for the number of passes in the print mode used.

Another measure that may be employed to hide possible print quality imperfections caused by good faith printing is to randomly dither for different nozzle rows in the printhead while in a physical print sweep using intra-sweep dithering. More particularly, in one embodiment, intra-sweep dithering tracks the amount of data received in memory 22 for a logical print sweep and assigns a variable X to represent the amount of data. A random limit R is set to represent a random amount of data for the sweep such that printing system 10 prints complete data only during a physical print sweep up to X-R.

In one embodiment, if printing system 10 reaches the point of X-R and X is not the end of the logical print sweep, then printing by one or more of the nozzles of printhead assembly 12 may be stopped at X-R and printing system 10 will randomly dither the rest of the data between X-R and X horizontally for each nozzle, or for groups of nozzles, and/or by color. Printhead assembly 12 will then wait for the remaining data. After the data arrives, printhead assembly 12 will print the remaining data in the logical print sweep by first finishing any remaining data between X-R and X, which was not printed in the first physical sweep, and then print the rest of the data remaining for the logical print sweep.

Figure 4A:
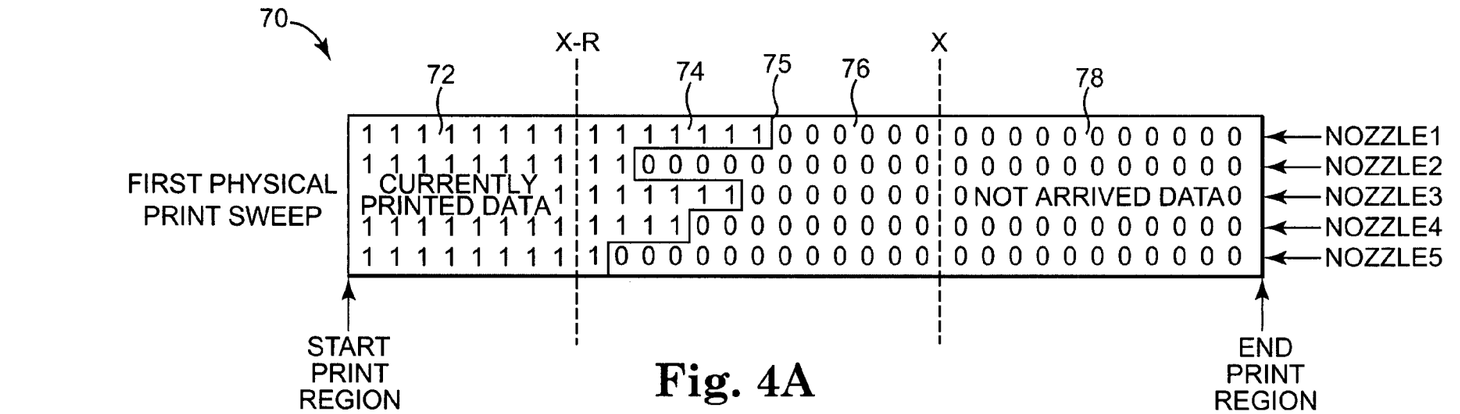
FIGS. 4A and 4B are graphic illustrations of intra-sweep dithering according to one embodiment of the present invention.
Figure 4B:
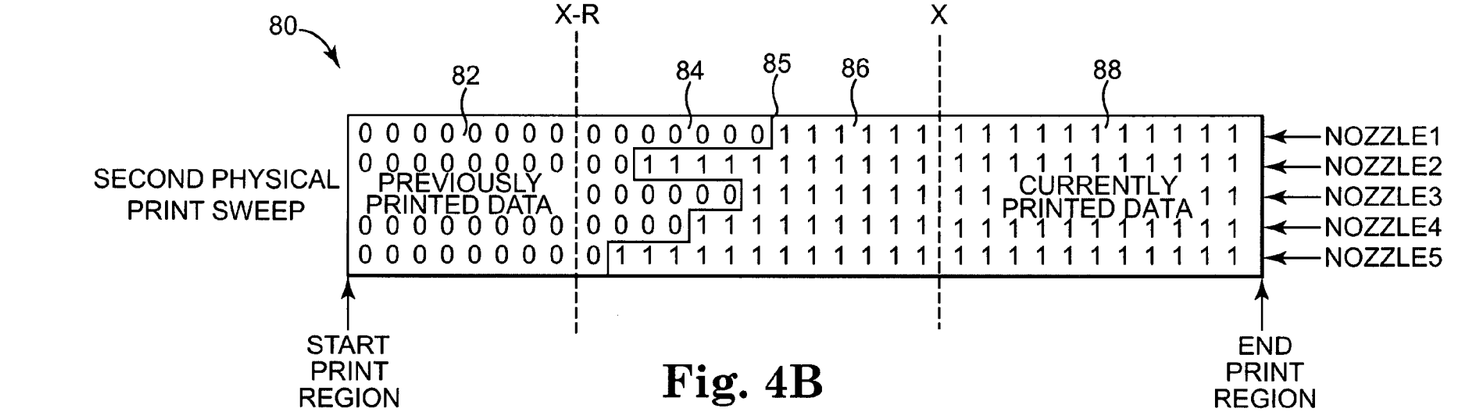

FIGS. 4A and 4B graphically illustrate an embodiment employing intra-sweep dithering to hide possible print quality imperfections caused by good faith printing. An embodiment having a single logical print sweep corresponding to a selected print region 17 is illustrated by the figures. The start and end of print region 17 are illustrated, and in one embodiment, may correspond to first and second sides 19A and 19B of media 19. The variable X represents the amount of data that is in memory 22 for the logical print sweep, and R represents a random amount of data assigned by printing system 10, as described above. Print region 17 during first physical print sweep 70 is illustrated in FIG. 4A and print region 17 during second physical print sweep 80 is illustrated in FIG. 4B.

In FIG. 4A, currently printed data 72, extending from the beginning of the print region during first physical print sweep 70 to the dotted line X-R, illustrates that some of the data for the logical print sweep is in memory 22 and is printed within print region 17 of media 19 during first physical print sweep 70. The area between dotted lines X-R and X illustrates the intra-sweep dithered data.

In one embodiment, the intra-sweep dithered data in first physical print sweep 70 is divided into two sections: the printed dithered data 74 and the non-printed dithered data 76. Printed dithered data 74 and non-printed dithered data 76 are separated by nozzle dithering line 75. The printed dithered data 74, extending from dotted line X-R to nozzle dithering line 75, illustrates random dithering of the data such that certain nozzles are operated or print longer than others during first physical print sweep 70.

Although hundreds of nozzles may be associated with printhead assembly 12, five nozzle rows are illustrated for simplicity. As illustrated, some nozzles are operated longer than others as printhead assembly 12 randomly delivers the intra-sweep dithered data. In one embodiment, nozzles are randomly controlled relative to each other to randomly deliver ink, and in other embodiments nozzles are grouped such that each group can be randomly dithered relative to other groups.

The non-printed dithered data 76, extending from the nozzle dithering line 75 to dotted line X, illustrates that, although an additional amount of data for the logical print sweep is in memory 22 during first physical print sweep 70, it is not printed onto media 19 during first physical print sweep 70 and is held for second physical print sweep 80. Not arrived data 78, extending from dotted line X to the end of the print region, illustrates that some of the data for the logical print sweep is not yet in memory 22 when printhead assembly 12 reached the X-R position during first physical print sweep 70.

In FIG. 4B, previously printed data 82, extending from the beginning of the print region during second physical print sweep 80 to the dotted line X-R, illustrates that some of the data for the logical print sweep was already printed during first physical print sweep 70. Again, the area between dotted lines X-R and X illustrates the intra-sweep dithered data. In one embodiment, the intra-sweep dithered data in second physical print sweep 80 is divided into two sections: the non-printed dithered data 84 and the printed dithered data 86.

Non-printed dithered data 84 and printed dithered data 86 are separated by nozzle dithering line 85. The non-printed dithered data 84, extending from dotted line X-R to nozzle dithering line 85, illustrates that data was previously printed during first physical print sweep 70 by randomly dithering the nozzles. The printed dithered data 86, extending from nozzle dithering line 85 to dotted line X, illustrates that the additional data for the logical print sweep that was in memory 22 during the first physical sweep and held is now printed within print region 17 of media 19 during second physical print sweep 80. As illustrated, some nozzles are started earlier than others as printhead assembly 12 moves through second physical print sweep 80 such that printed dithered data 86 complements printed dithered data 74 of first physical print sweep 70. Currently printed data 88, extending from dotted line X to the end of the print region, illustrates that the remaining data for the logical print sweep that is received in memory 22 is printed during second physical print sweep 80.

The intra-sweep dithered data between dotted line X-R and dotted line X, because of the randomly selected nozzle dithering line 85, effectively prevents a perceivable break in the data printed within print region 17 of media 19. As the number of nozzles that are dithered increases, the more difficult it will be to detect a break in the printed data. Because intra-sweep dithering effectively hides possible print quality imperfections within a single logical print sweep, intra-sweep dithering can be utilized even in single sweep print modes to hide possible print quality imperfections that may otherwise be caused with using good faith printing.

Figure 5:
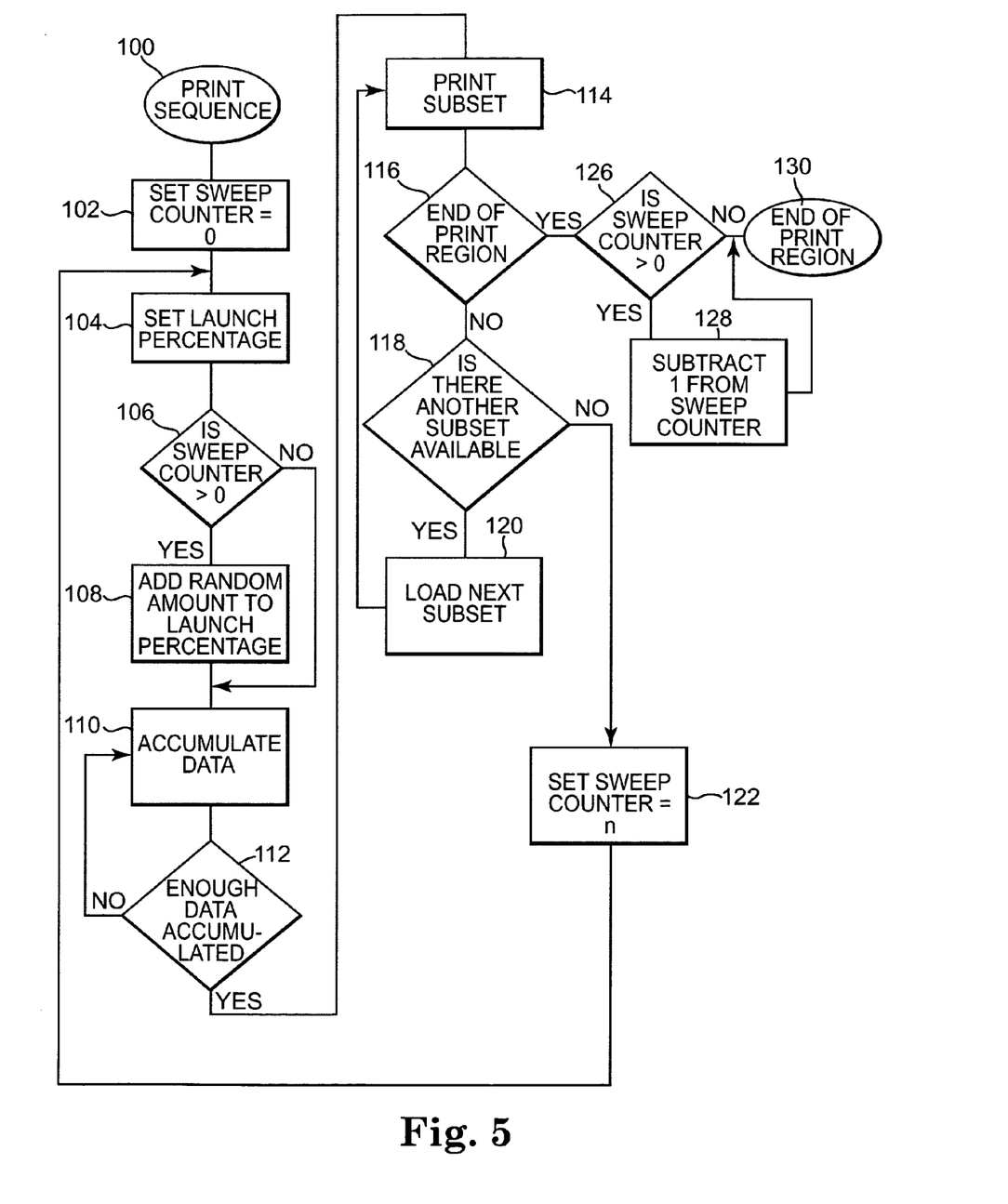
FIG. 5 is a flow diagram illustrating one embodiment of good faith printing according to one embodiment of the present invention.

FIG. 5 is a flow diagram illustrating one embodiment of good faith printing in accordance with the present invention. In the illustrated embodiment, good faith printing is used in conjunction with a variable launch percentage to hide possible print quality imperfections that may occur during the good faith printing on a printer in a print system. In one embodiment, data is received in a sweep buffer of a memory in the printer for printing within a print region of a media. Data that is received in the sweep buffer is ordered into logical print sweeps that correspond with physical print sweeps of a printhead assembly across the print region. Furthermore, the data of each logical print sweep is further subdivided into subsets of data. For example, data for a logical print sweep may be configured to print across a print region of the media corresponding to a physical print sweep that is 8 inches wide.

In one exemplary embodiment, the data of this logical print sweep may be 300 kilobytes (kb). In this exemplary embodiment, the data may be subdivided into 16 subsets, each of which is approximately 18.75 kb. Also in the exemplary embodiment, the printer is set in one of a plurality of available multi-pass print modes. For example, a draft print mode may have 1 pass, a fast print mode may have 2 passes, a normal print mode may have 4 passes, a best print mode may have 8 passes, and a marvelous print mode may have 10 passes.

As illustrated in the embodiment of FIG. 5, a print sequence is initiated at 100. At 102, a sweep counter is initially set to 0, but later in the sequence this sweep counter may be set to equal the number of passes in the selected mode under certain circumstances. At 104, a launch percentage is initially set. In one exemplary embodiment, the launch percentage may be set at 60 percent. In this way, initially 60 percent of the data for a logical print sweep will have to be received in the sweep buffer before the corresponding physical print sweep begins across the print region of the media.

At 106 a determination is made as to whether the sweep counter is greater than or equal to zero. Where the sweep counter is zero, such as when the sequence is first started, the initial launch percentage is not changed and data is accumulated at 110. Where the sweep counter is greater than zero (meaning that a punt had occurred at some earlier time as will be explained below) then the launch percentage is changed by a random amount at 108.

Randomization of the launch percentage can be done in a variety of ways consistent with the present invention. For example, each logical print sweep of data can be divided into a known number of subsets of data. The system can collect subsets of data for a logical print sweep until, for example, the number of subsets of data correspond to 60 percent of the data. Then the number of subsets of data left in a logical print sweep after 60 percent of the data is collected can be determined.

For example, if there are 16 subsets of data in a logical print sweep, 10 subsets of data would need to be collected in the sweep buffer before the physical print sweep begins. A random number of subsets of data may then be added to the number of subsets of data that equal 60 percent of the data for the entire logical print sweep thereby randomly increasing the launch percentage of the print system. For example, a random number from 1 to 6 could be added to 10 thereby randomly dithering the launch percentage necessary to launch the physical print sweep. After the launch percentage is changed by a random amount at 108, data is collected at 110.

After data is accumulated at 110, a determination is made at 112 as to whether enough data has been accumulated. In the exemplary embodiment where the launch percentage is 60 percent, then collecting 60 percent of the data will satisfy this condition. In embodiments where the launch percentage is higher, additional data will be needed. Accordingly, additional data is accumulated at 110 until the launch percentage is achieved. Understandably, in embodiments where the launch percentage is lower, less data will be needed.

Next, the physical print sweep is initiated for one subset of data at a time. The first subset of data of the logical print sweep is printed during the physical print sweep at 114. At 116 a decision is then made as to whether the end of the print region was reached after the subset of data is printed. If it was not reached, at 118 it is determined whether another subset of data for that logical print sweep is available in the sweep buffer. If another subset of data is available, it is loaded at 120 and the system cycles back to 114 to print that subset of data.

If another subset of data is not available at 118, then the print system must punt. Since no additional data is available in the print buffer, the printing stops at 122, and the sweep counter is set to the number of passes in the selected print mode. For example, if the normal print mode having 4 passes was selected, the sweep counter is set to 4. The system then cycles back to 104. The printhead can remain at the punt boundary, retrace back to a start location, or move to some other location.

If the end of the print region was reached after the subset of data is printed at 116, then a decision is made at 126 as to whether the sweep counter is greater than zero. If the sweep counter is greater than zero, then at 128 the sweep counter is decremented by one and the end of the print region is reached at 130. In this way, the sweep counter tracks the number of passes that have occurred since the last punt took place. If the sweep counter is not greater than zero, then the end of the print region is reached at 130.

Consequently, at least a number of passes of the printhead over the entire print region equal to the number of passes in a print mode will occur after each punt of the system, which helps minimize possible print quality imperfections even where punts have occurred. Also, when a number of passes of the printhead over the entire print region occur with no punt, the sweep counter will be zero and system performance will be enhanced since the random variation in launch percentage will be "switched off" in this situation. Whenever a punt does occur, however, the counter is set to equal the number of passes in the print mode and random variation in launch percentage will be "switched on" for at least the remaining number of passes of the printhead over the entire print region equal the number of passes in the print mode. In another embodiment, the sweep counter may be set to a larger number, such as twice the number of passes in the print mode, to further minimize possible print quality imperfections.

It is understood that the example illustrated by FIG. 5 can be altered in a variety of ways consistent with the present invention. For example, various types of dithering, inter-sweep dithering, launch percentage dithering, or intra-sweep dithering may be used. In the case of launch percentage dithering, the launch percentages used can be changed. The way the launch percentage is varied can be done in a variety of ways, and the randomization can be done in many ways. For example, a modulus could be used to calculate the random variation of the launch percentage. For any of the dithering techniques used, they may each be switched on and off as needed.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system for printing on media, the system comprising:
   a printhead assembly configured to make physical print sweeps relative to print regions of the media and to print within the print regions during the physical print sweeps;
   a memory communicated with the printhead assembly and configured to receive data associated with a logical print sweep, the data associated with the logical print sweep controlling printing within a first portion of a first print region of the media during a corresponding first physical print sweep of the printhead assembly; and
   a controller communicated with the printhead assembly and the memory, wherein the controller initiates the first physical print sweep of the printhead assembly before all of the data associated with the logical print sweep is received by the memory;
   wherein a punt boundary separates the data printed within the first portion of the first print region during the first physical print sweep from data printed within a second portion of the first print region during a second physical print sweep and
   wherein the printhead assembly stops printing when additional data associated with the logical print sweep is not received during the first physical print sweep of the printhead assembly;
   wherein the printhead assembly prints data associated with the logical print sweep within a second portion of the first print region during a corresponding second physical print sweep; and
   wherein a punt boundary separates the data printed during the first physical print sweep from the data printed during the second physical print sweep, wherein the punt boundary is randomly dithered within a single logical print sweep.

2. The system of claim 1 wherein the memory receives additional data associated with the logical print sweep during the first physical print sweep of the printhead assembly.

3. A system for printing on media, the system comprising:
 a printhead assembly configured to make physical print sweeps relative to print regions of the media and to print within the print regions during the physical print sweeps;
 a memory communicated with the printhead assembly and configured to receive data associated with a logical print sweep, the data associated with the logical print sweep controlling printing within a first portion of a first print region of the media during a corresponding first physical print sweep of the printhead assembly; and
 a controller communicated with the printhead assembly and the memory, wherein the controller initiates the first physical print sweep of the printhead assembly before all of the data associated with the logical print sweep is received by the memory;
 wherein a punt boundary separates the data printed within the first portion of the first print region during the first physical print sweep from data printed within a second portion of the first print region during a second physical print sweep, and wherein the memory receives data associated with multiple logical print sweeps, wherein the punt boundary is randomly dithered between logical print sweeps.

4. The system of claim 3 wherein the system employs multi-pass printing and the memory receives data associated with multiple logical print sweeps for the first print region, wherein the punt boundary is randomly dithered between respective logical print sweeps for the first print region.

5. The system of claim 3 wherein the punt boundary is randomly dithered between logical print sweeps by employing inter-sweep dithering.

6. The system of claim 5 wherein inter-sweep dithering includes tracking the amount of data received in the memory for each logical print sweep and causing the printhead assembly to stop printing at a random time before data in the memory is no longer available for each logical print sweep.

7. A method of printing on media, the method comprising:
 positioning a printhead assembly relative to the media and sweeping the printhead assembly in physical print sweeps within print regions of the media, including printing within the print regions during the physical print sweeps;
 receiving data associated with a logical print sweep into a memory, the data associated with the logical print sweep controlling printing within a first print region of the media during a corresponding first physical print sweep of the printhead assembly;
 printing with the printhead assembly in a first portion of the first print region of the media, including initiating the first physical print sweep of the printhead assembly before all of the data associated with the logical print sweep is received by the memory;
 wherein a punt boundary separates the data printed within the first portion of the first print region during the first physical print sweep from data printed within a second portion of the first print region during a second physical print sweep;
 stopping printing when additional data associated with the logical print sweep is not received during the first physical print sweep of the printhead assembly;
 printing data associated with the logical print sweep in a second portion of the first print region of the media during a corresponding second physical print sweep; and
 randomly dithering a punt boundary within a single logical print sweep, wherein the punt boundary separates the data printed during the first physical print sweep from the data printed during the second physical print sweep.

8. The method of claim 7 further comprising receiving additional data associated with the logical print sweep during the first physical print sweep of the printhead assembly.

9. A method of printing on media, the method comprising:
 positioning a printhead assembly relative to the media and sweeping the printhead assembly in physical print sweeps within print regions of the media, including printing within the print regions during the physical print sweeps;
 receiving data associated with a logical print sweep into a memory, the data associated with the logical print sweep controlling printing within a first print region of the media during a corresponding first physical print sweep of the printhead assembly;
 printing with the printhead assembly in a first portion of the first print region of the media, including initiating the first physical print sweep of the printhead assembly before all of the data associated with the logical print sweep is received by the memory; and
 defining a punt boundary between the data printed in the first portion of the first print region during the first physical print sweep and data printed in a second portion of the first print region during a second physical print sweep, including randomly dithering the punt boundary between logical print sweeps.

10. The method of claim 9 wherein randomly dithering includes inter-sweep dithering between logical print sweeps.

11. The method of claim 10 wherein inter-sweep dithering includes tracking the amount of data received in the memory for each logical print sweep and stopping printing at a random time before data in the memory is no longer available for each logical print sweep.

12. A system for printing on media, the system comprising:
 a printhead assembly configured to make physical print sweeps relative to print regions of the media and to print within the print regions during the physical print sweeps;
 memory communicating with the printhead assembly and configured to receive data associated with a logical print sweep, the data associated with the logical print sweep controlling printing within a first portion of a first print region of the media during a corresponding first physical print sweep of the printhead assembly; and
 means for initiating the first physical print sweep of the printhead assembly before all of the data associated with the logical print sweep is received by the memory;
 wherein a punt boundary separates the data printed within the first portion of the first print region during the first physical print sweep from data printed within a second portion of the first print region during a second physical print sweep;
 wherein the printhead assembly stops printing when remaining data associated with the logical print sweep is not received during the first physical print sweep
 wherein the printhead assembly prints data associated with the logical print sweep within a second portion of the first print region of the media during a second physical print sweep; and wherein a punt boundary separates the data printed during the first physical print sweep from the data printed during the second physical print sweep, wherein the punt boundary is randomly dithered within a single logical print sweep.

13. A system for printing on media, the system comprising:

a printhead assembly configured to make physical print sweeps relative to print regions of the media and to print within the print regions during the physical print sweeps;

memory communicating with the printhead assembly and configured to receive data associated with a logical print sweep, the data associated with the logical print sweep controlling printing within a first portion of a first print region of the media during a corresponding first physical print sweep of the printhead assembly; and means for initiating the first physical print sweep of the printhead assembly before all of the data associated with the logical print sweep is received by the memory;

wherein a punt boundary separates the data printed during the first physical print sweep from the data printed during a second physical print sweep, and wherein the punt boundary is randomly dithered between respective logical print sweeps.

14. The system of claim 13 wherein the punt boundary is randomly dithered between logical print sweeps by employing inter-sweep dithering.

15. The system of claim 14 wherein inter-sweep dithering includes tracking the amount of data received in the memory for each logical print sweep and causing the printhead assembly to stop printing at a random time before data in the memory is no longer available for each logical print sweep.

* * * * *